(12) United States Patent
Khan

(10) Patent No.: US 9,746,230 B2
(45) Date of Patent: Aug. 29, 2017

(54) FLAME RETARDANT DOOR FOR TRANSPORT REFRIGERATION UNIT

(75) Inventor: Shafi N. Khan, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 151 days.

(21) Appl. No.: 14/394,654

(22) PCT Filed: Apr. 18, 2012

(86) PCT No.: PCT/US2012/034036
§ 371 (c)(1),
(2), (4) Date: Oct. 15, 2014

(87) PCT Pub. No.: WO2013/158087
PCT Pub. Date: Oct. 24, 2013

(65) Prior Publication Data
US 2015/0076162 A1 Mar. 19, 2015

Related U.S. Application Data

(63) Continuation-in-part of application No. 12/280,083, filed as application No. PCT/US2006/006695 on Feb. 24, 2006, now Pat. No. 8,181,476.

(51) Int. Cl.
*F25D 11/00* (2006.01)
*F25D 23/02* (2006.01)
*B60P 3/20* (2006.01)

(52) U.S. Cl.
CPC .............. *F25D 11/003* (2013.01); *B60P 3/20* (2013.01)

(58) Field of Classification Search
CPC ........ F25D 11/003; F25D 23/028; F25D 1/00; F25D 23/02; F25D 11/00; F25D 19/003;
(Continued)

(56) References Cited

U.S. PATENT DOCUMENTS 3,992,482 A    11/1976    Kraft et al.
4,087,125 A *    5/1978    Stephens ................. B60P 3/205
                                                             296/24.35

(Continued)

FOREIGN PATENT DOCUMENTS

EP    0392024 A1    10/1990
EP    2107206 A1    10/2009
(Continued)

OTHER PUBLICATIONS

International Search Report for application PCT/US2012/034036, mailed Jan. 17, 2013, 5 pages.
(Continued)

*Primary Examiner* — Mohammad M Ali
(74) *Attorney, Agent, or Firm* — Cantor Colburn LLP

(57) ABSTRACT

A cover for a transport refrigeration unit has at least one door (150) having a body formed of an inner sheet (152) and an outer sheet (154) and a joint (156) formed between the respective peripheral edges ((153), 155) of the inner and outer sheets such that the respective peripheral edges are integrally bonded together to provide a cavity (157) between the inner and outer sheets, with at least one of the inner sheet and the outer sheet formed of a flame retardant material. In an embodiment, the inner sheet (152) is formed of a flame retardant thermoplastic olefin sheet and the outer sheet (154) is formed of a non-flame retardant thermoplastic olefin sheet.

7 Claims, 2 Drawing Sheets

(58) Field of Classification Search
CPC .......... B60P 3/20; F25B 2500/12; B60H 1/32;
Y10T 29/49885
USPC .......................... 62/239; 220/592.03, 62.11
See application file for complete search history.

(56) References Cited

U.S. PATENT DOCUMENTS

| | | | |
|---|---|---|---|
| 4,365,484 A | | 12/1982 | Carson |
| 4,572,856 A | | 2/1986 | Gembinski |
| 4,608,104 A | | 8/1986 | Holtrop |
| 4,780,359 A | | 10/1988 | Trask |
| 4,980,223 A | * | 12/1990 | Nakano .................. B32B 15/08 174/36 |
| 5,065,587 A | * | 11/1991 | Howland ............. B60H 1/3232 200/61.62 |
| 5,108,529 A | | 4/1992 | Shuert |
| 5,168,621 A | | 12/1992 | Kruck |
| 5,283,028 A | | 2/1994 | Breezer |
| 5,388,424 A | | 2/1995 | Chopko |
| 5,533,311 A | | 7/1996 | Tirrell et al. |
| 5,595,415 A | | 1/1997 | Beaulat |
| 5,635,129 A | | 6/1997 | Breezer et al. |
| 5,716,581 A | | 2/1998 | Tirrell |
| 5,885,691 A | | 3/1999 | Breezer |
| 5,962,089 A | | 10/1999 | Jones et al. |
| 6,123,032 A | | 9/2000 | Ohanesian |
| 6,372,176 B1 | | 4/2002 | Ekendahl et al. |
| 6,444,073 B1 | | 9/2002 | Reeves et al. |
| 6,718,888 B2 | | 4/2004 | Muirhead |
| 6,758,148 B2 | | 7/2004 | Torrey et al. |
| 6,849,677 B2 | | 2/2005 | Overholt |
| 6,955,129 B2 | | 10/2005 | Moore, Jr. et al. |
| 6,969,246 B1 | | 11/2005 | Kundinger et al. |
| 7,157,034 B2 | | 1/2007 | Bristow et al. |
| 7,255,391 B2 | | 8/2007 | Bristow et al. |
| 7,263,855 B2 | | 9/2007 | Meyer et al. |
| 7,735,430 B2 | | 6/2010 | Muirhead |
| 7,866,730 B2 | | 1/2011 | Lewis et al. |
| 7,913,511 B2 | | 3/2011 | Meyer et al. |
| 7,963,235 B2 | | 6/2011 | Muirhead |
| 8,091,487 B2 | | 1/2012 | Apps |
| 2001/0031316 A1 | * | 10/2001 | Nozaki .................. C08K 3/02 427/385.5 |
| 2003/0079660 A1 | | 5/2003 | Torrey |
| 2004/0168618 A1 | | 9/2004 | Muirhead |
| 2004/0197547 A1 | | 10/2004 | Bristow |
| 2006/0011108 A1 | | 1/2006 | Abu-Isa |
| 2006/0277938 A1 | | 12/2006 | Meyer |
| 2007/0014978 A1 | | 1/2007 | Poloso |
| 2007/0289976 A1 | | 12/2007 | Meyer |
| 2009/0126600 A1 | | 5/2009 | Zupancich |
| 2009/0126854 A1 | | 5/2009 | Khan |
| 2010/0123263 A1 | | 5/2010 | Lewis |
| 2010/0162743 A1 | | 7/2010 | Khan |
| 2010/0251941 A1 | | 10/2010 | Muirhead |
| 2011/0017106 A1 | | 1/2011 | Muirhead |

FOREIGN PATENT DOCUMENTS

| | | |
|---|---|---|
| JP | 2002255087 A | 9/2002 |
| JP | 3780473 B2 | 5/2006 |
| WO | 2007106067 A2 | 9/2007 |
| WO | 2007133200 A2 | 11/2007 |

OTHER PUBLICATIONS

Written Opinion for application PCT/US2012/034036, mailed Jan. 17, 2013, 5 pages.

* cited by examiner

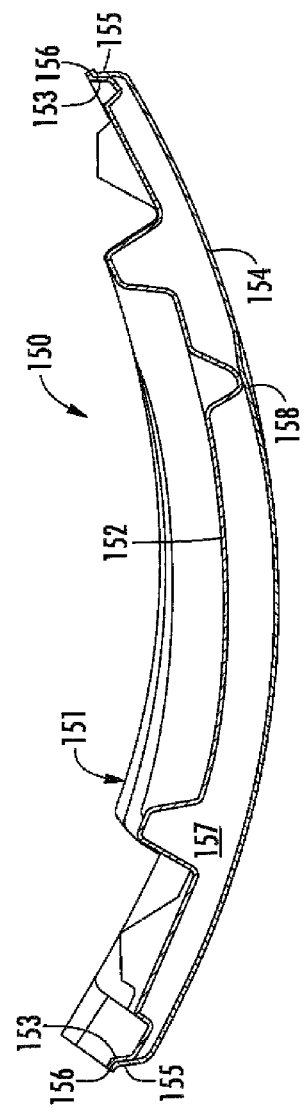

FLAME RETARDANT DOOR FOR TRANSPORT REFRIGERATION UNIT

CROSS-REFERENCE TO RELATED APPLICATIONS

This application is related to and is a continuation-in-part of U.S. patent application Ser. No. 12/280,083, filed Aug. 20, 2008, which is the U.S. national stage application of International Patent Application No. PCT/US2006/006695, filed Feb. 24, 2006, and entitled: "COMPOSITE DOORS FOR TRANSPORT REFRIGERATION UNIT", and which was published on Jul. 1, 2010, as U.S. Patent Application Publication No. US2010/0162743 A1, the disclosure of which is hereby incorporated herein by reference in its entirety.

BACKGROUND

This disclosure invention relates generally to transport refrigeration units and in particular to outer protective covers for transport refrigeration units of the type mounted to a wall of a mobile refrigerated cargo box.

Transport refrigeration units are employed for conditioning the atmosphere within the interior of a refrigerated cargo box, such as a refrigerated trailer of the type commonly pulled by a tractor cab. Commonly, the transport refrigeration unit is designed for mounting on the front wall of a trailer behind the tractor cab. A typical transport refrigeration unit includes a one piece, self-contained fully refrigerant charged, prewired, refrigerant/heating unit powered by an engine, commonly a diesel engine. The transport refrigeration unit further includes a condensing section and an evaporator section. In such a design, the evaporator section fits into a rectangular opening in the upper portion of the trailer front wall and therefore, when the transport refrigeration unit is installed on the trailer front wall, the evaporator section is located inside the cargo box of the trailer. The condensing section, which is located outside the cargo box on the front wall of the trailer when the transport refrigeration unit is installed on the trailer front wall, includes an engine-compressor drive package, condenser fan, condenser coil, radiator coil, control panel, relay module, refrigerant controls, piping, wiring and associated components.

A structural framework, formed of a plurality of structural frame members, supports all of the components and facilitates attaching the transport refrigeration unit to the trailer front wall. Also supported by the structural framework is an outer cover that includes the necessary air inlet and outlet openings for air flow through the condensing section, and a plurality of doors that may be opened to provide access to the interior of the transport refrigeration unit for maintenance and service.

The access doors may include both front and side doors which should be light in weight, having adequate structural strength so as to withstand significant impacts without being damaged structurally or cosmetically, and provide an attractive appearance. They should also have sufficient torsional stiffness to hold their shape and provide adequate sound damping capabilities. Generally a composite structure with a foam inner core has been used to obtain these characteristics. The use of foam adds complexity and expense to the manufacturing process.

SUMMARY

The flammability resistance of a front cover of a transport refrigeration unit is improved through the use of a flame retardant door. The flame retardant door includes a body having an inner sheet and an outer sheet, and a joint formed between the respective peripheral edges of the inner and outer sheets such that the respective peripheral edges are integrally bonded together to provide a cavity between the inner and outer sheets. At least one of said inner sheet and said outer sheet is formed of a flame retardant material. In an embodiment, both the inner sheet and the outer sheet are formed of a plastic material, the plastic material of which the inner sheet is formed being a flame retardant plastic material. In an embodiment, the inner sheet is a flame retardant olefin sheet and the outer sheet is a non-flame retardant olefin sheet. In an embodiment, both of the inner sheet and the outer sheet are formed of a flame retardant material. In an embodiment, both the inner sheet and the outer sheet are flame retardant thermoplastic olefin sheets.

BRIEF DESCRIPTION OF THE DRAWINGS

For a further understanding of the disclosure, reference will be made to the following detailed description which is to be read in connection with the accompanying drawing, wherein:

FIG. 2 is a sectional view of a front flame retardant door of the cover as taken along lines 2-2 of FIG. 1.

DETAILED DESCRIPTION

Figure 1:
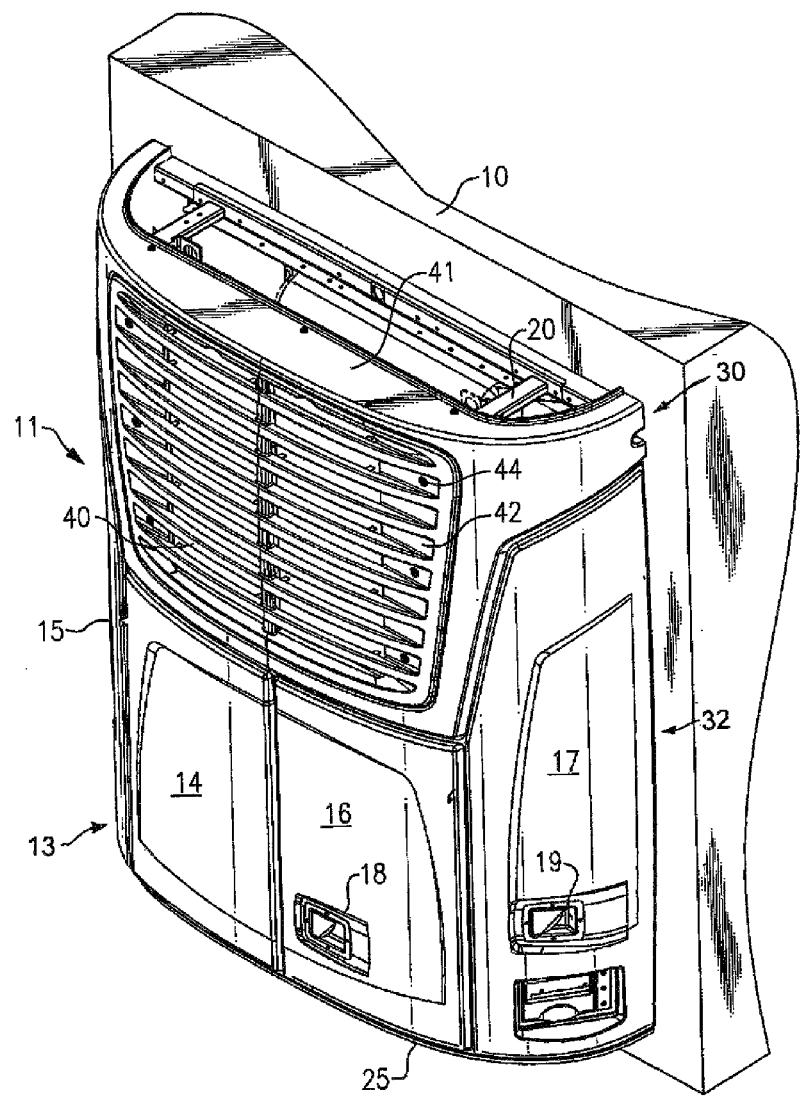
FIG. 1 is a perspective view of a transport refrigeration unit having a front cover having a plurality of flame retardant doors.

Referring initially to FIG. 1, a fragmentary front part of a large transport trailer 10 defining a cargo box is depicted with a transport refrigeration unit 11 shown mounted on the front wall of the trailer 10 and having a front cover, generally designated 13. Attachment of the refrigeration unit 11 to the trailer 10 is carried out by connection of an outer peripheral planar structural steel framework illustrated generally by reference numeral 20. It should be appreciated that this framework is not normally visible when the unit is properly installed on the trailer 10, however for purposes of illustration, at least a portion of the structural framework is illustrated in FIG. 1.

The front cover 13 has an upper portion 30 and a lower portion 32. The upper portion 30 and the lower portion 32 are designed to cooperate to fully enclose the transport refrigeration unit 11 to provide protection from the environment and road hazards and to aerodynamically and aesthetically enhance the transport refrigeration unit 11.

The upper portion 30 of the front cover includes a rigid front grille member 40 and a flexible support structure 41 disposed in surrounding relationship therewith. The grille member 40 is positioned in overlying relationship with the condenser heat exchanger of the refrigeration unit and is provided with a large number of openings 42 therethrough to facilitate air flow for efficient heat transfer. The support member 41 is secured to the frame 20 and the front grille is fastened to the support structure 41 by appropriate fastening means as at 44.

The lower portion 32 of the front cover 13 includes a plurality of doors 14, 15, 16 and 17 that when shut form an enclosure about the inner structural components of the transport refrigeration unit 11, as well as some of the components of the transport refrigeration unit 11 itself located behind the outer front cover 13. Each of the doors 14, 15, 16 and 17 when open provides access to the inner structural components of the unit as well as some of the components of the transport refrigeration unit 11 itself located behind the outer front cover 13. For purposes of the present description the terms "roadside" and "curbside" will be used in describing various components of the refrigeration unit and its cover. As viewed in FIG. 1, the right hand side of the unit will be referred to as the roadside and the left hand side of the unit as the curbside of the unit. With this reference, the transport refrigeration unit 11 as illustrated in FIG. 1 has the curbside front door 14, the curbside outer door 15, the roadside front door 16, and the roadside outer door 17 in their closed positions.

Each of the doors 14, 15, 16, 17 may be supported on hinges so as to pivot open. For example, in the depicted embodiment, the front curbside door 14 and the front roadside door 16 are vertically hinged at their respective outer edges to pivot open to provide a large access opening at the front of the transport refrigeration unit 11, and the curbside outer door 15 and the roadside outer door 17 are vertically hinged at their rear edges such that they pivot open from front to back. Latches 18 and 19 are provided for latching and unlatching the front roadside door 16 and side roadside door 17, respectively. Additionally a cover bottom panel may be attached to the transport refrigeration unit 11 to provide closure and to improve the aesthetics of the transport refrigeration unit 11.

Each of the doors 14, 15, 16, 17 forming the lower portion 32 of the front cover 13 may be made from a tough, light-weight composite material designed to resist rust, denting, warping, fading or peeling of their outer finish. Referring now to FIG. 2, each of the doors 14, 15, 16 and 17 may be formed as a composite door 150 including an inner sheet 152 having a peripheral edge 153 and an outer sheet 154 having a peripheral edge 155. The inner sheet 152 and outer sheet 154 are bonded together at their respective peripheral edges 153, 155 to form a peripheral joint 156 extending along the entirety of their peripheral edges so as to thereby provide a hollow space or cavity 157 between the inner and outer sheets. Additionally, the inner sheet 152 and outer sheet 154 may also be bonded together at one or more locations to an auxiliary joint or joints 158 between the inner sheet 152 and the outer sheet 154 within the hollow space or cavity 157 outlined by the bonded peripheral edges of the inner and outer sheets.

For example, the inner and outer sheets 152, 154 may be made of a high strength thermoplastic material and be bonded together at their peripheral edges by a twin-sheet thermoforming bonding process. For a detailed description of a composite door for transport refrigeration unit formed of an inner sheet of a thermoplastic olefin material and an outer sheet of thermoplastic olefin material bonded together along their peripheral edges by a twin-sheet thermoforming process to thereby provide a hollow space or cavity between the inner and outer sheets, referenced may be had to the aforementioned U.S. Patent Application Publication No. US 2010/0162743 A1, which is incorporated herein by reference in its entirety.

In accordance with the disclosure, a flame retardant door 150 is provided for use in forming the front cover 13 of the transport refrigeration unit 11. At least one, and generally all of the doors 14, 15, 16 and 17 forming the lower portion 32 of the front cover 13, may comprise flame retardant doors 150 constructed as disclosed herein. As illustrated in FIG. 2, the flame retardant door 150 includes a body 151 having an inner sheet 152 having a peripheral edge 153 and an outer sheet 154 having a peripheral edge 155, and a joint 156 formed between the respective peripheral edges 153, 155, respectively, of the inner and outer sheets 152, 154 such that the respective peripheral edges are integrally bonded together to provide a hollow space or cavity 157 between the inner and outer sheets 152, 154.

To provide a flame retardant characteristic to the door, at least one of the inner sheet 152 and the outer sheet 154 comprises a sheet formed of a flame retardant material. To provide the door 150 with a flame retardant characteristic protective against an equipment fire within the transport refrigerant unit 11 spreading rapidly to areas outside the front cover 13 of the transport refrigeration unit 11, generally at least the inner sheet 152 comprises a sheet of flame retardant material. For example, the inner sheet 152 could be a sheet of flame retardant, high strength plastic material, such as for example thermoplastic olefin impregnated with a flame retardant compound such as, for example, but not limited to antimony tri-oxide and aluminum oxides, while the outer sheet could remain a sheet non-flame retardant material. To provide the door 150 with a flame retardant characteristic protective against a fire outside the transport refrigerant unit 11 from rapidly spreading to the components of the transport refrigeration unit 11 enclosed within the front cover 13, at least the outer sheet 154 could be a sheet of flame retardant, high strength material, plastic material, such as for example thermoplastic olefin impregnated with a flame retardant compound. In an embodiment, both the inner sheet 152 and the outer sheet 154 may be formed of a fire retardant material, such as for example, a high strength plastic material, such as flame retardant thermoplastic olefin sheets.

The twin sheet thermoforming process enables the use of flame retardant thermoplastic sheets and non-flame retardant thermoplastic sheets for the inner and outer sheets to form the door in the various configurations discussed above to be used in constructing a flame retardant door. Thus, a door having improved flammability resistance may be manufactured cost effectively versus other processes for providing some degree of flammability resistance such as, coating the inner surface of door with flame retardant paint or flame resistant foam, or lining the door with a metallic liner.

The terminology used herein is for the purpose of description, not limitation. Specific structural and functional details disclosed herein are not to be interpreted as limiting, but merely as basis for teaching one skilled in the art to employ the invention. Those skilled in the art will also recognize the equivalents that may be substituted for elements described with reference to the exemplary embodiments disclosed herein without departing from the scope of the appended claims.

While the transport refrigeration unit and cover therefor disclosed herein have been particularly shown and described with reference to the exemplary embodiments as illustrated in the drawing, it will be recognized by those skilled in the art that various modifications may be made without departing from the spirit and scope of the appended claims. Therefore, it is intended that the present disclosure not be limited to the particular embodiment(s) disclosed, but that the disclosure will include all embodiments falling within the scope of the appended claims.

I claim:

1. A transport refrigeration unit for conditioning an atmosphere within an interior of a refrigerated cargo box, the transport refrigeration unit comprising:
    a transport refrigeration unit structural frame including a section to be attached to a front wall of the refrigerated cargo box; and
    a front cover for enclosing the transport refrigeration unit and supported by the structural frame, the front cover having a grille member to facilitate airflow over a condenser heat exchanger of the transport refrigeration unit;

the front cover including a plurality of doors positioned adjacent to the grille member, wherein at least one of said plurality of doors having:

a body having an inner sheet and an outer sheet with both of said inner sheet and said outer sheet having a peripheral edge; and a joint formed between the respective peripheral edges of said inner and outer sheets such that the respective peripheral edges are integrally bonded together to provide a cavity between said inner and outer sheets, wherein at least one of said inner sheet and said outer sheet is formed of a flame retardant material.

2. The transport refrigeration unit as set forth in claim 1 wherein both of said inner sheet and said outer sheet are formed of a fire retardant material.

3. The transport refrigeration unit as set forth in claim 1 wherein both said inner sheet and said outer sheet are formed of a plastic material, the plastic material of which said inner sheet is formed being a flame retardant material.

4. The transport refrigeration unit as set forth in claim 1 wherein said inner sheet comprises a flame retardant thermoplastic olefin sheet.

5. The transport refrigeration unit as set forth in claim 1 wherein both said inner sheet and said outer sheet comprises a flame retardant thermoplastic olefin sheet.

6. The cover for a transport refrigeration unit as set forth in claim 1, wherein the front cover includes an upper portion and a lower portion cooperating to enclose the transport refrigeration unit.

7. The cover for a transport refrigeration unit as set forth in claim 1, wherein the grille is located in the upper portion and the plurality of doors are located in the lower portion.

* * * * *